Sept. 12, 1967    J. E. MATZKE    3,340,792
APPARATUS FOR FRYING DOUGHNUTS AND LIKE PRODUCTS
Filed July 1, 1966    3 Sheets-Sheet 1
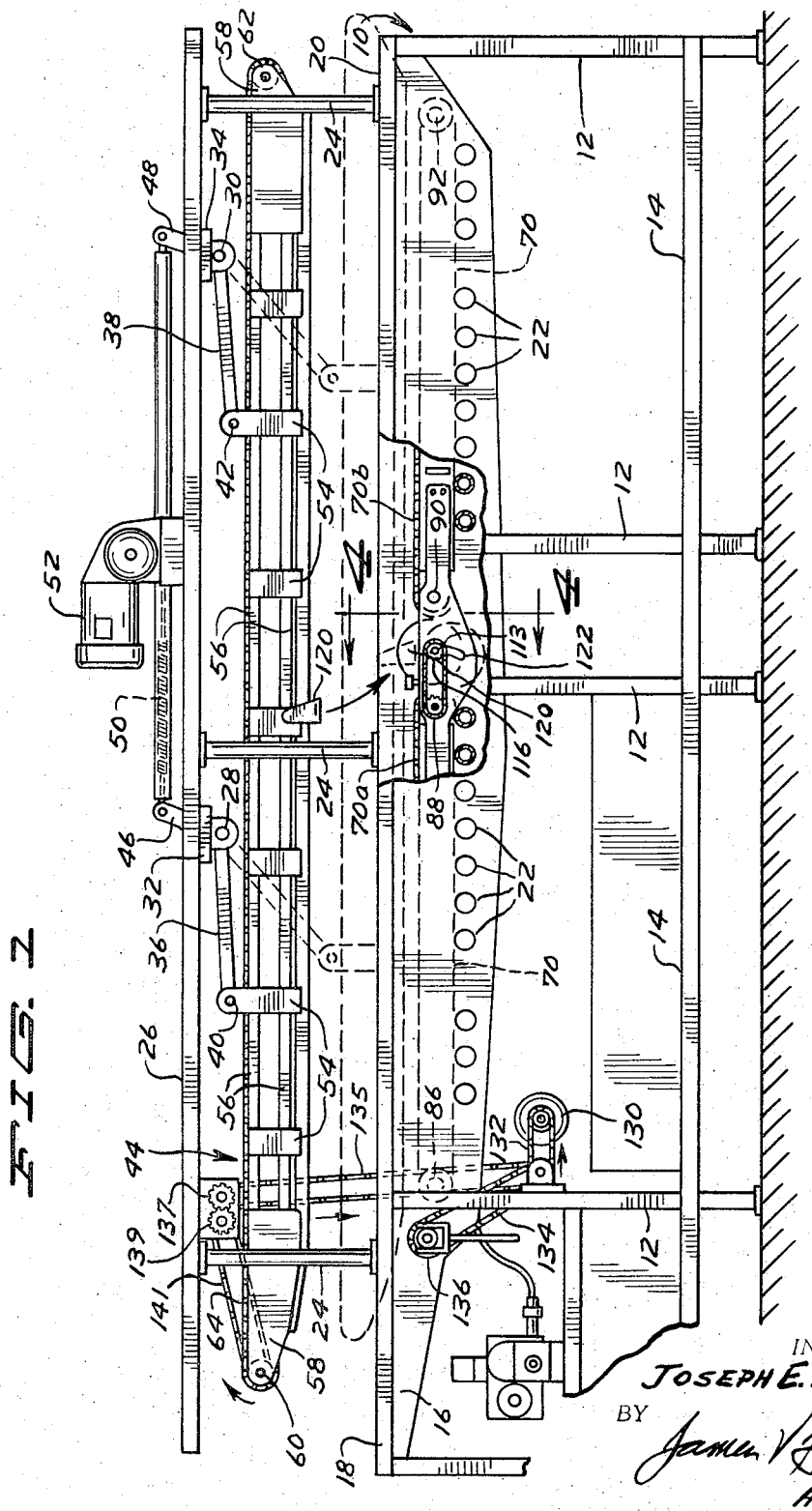
INVENTOR.
JOSEPH E. MATZKE
BY
James V. Harmon
ATTORNEY

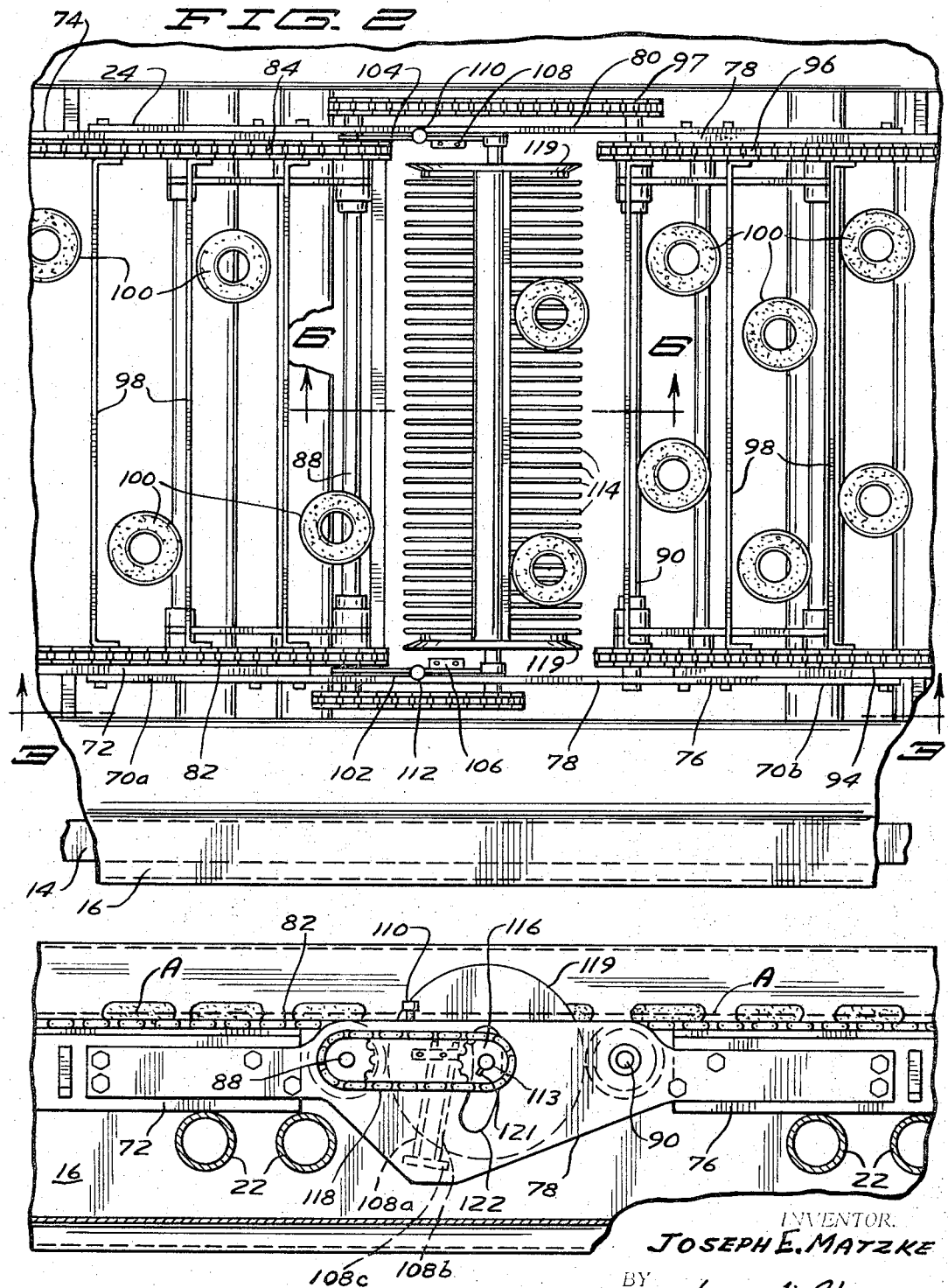

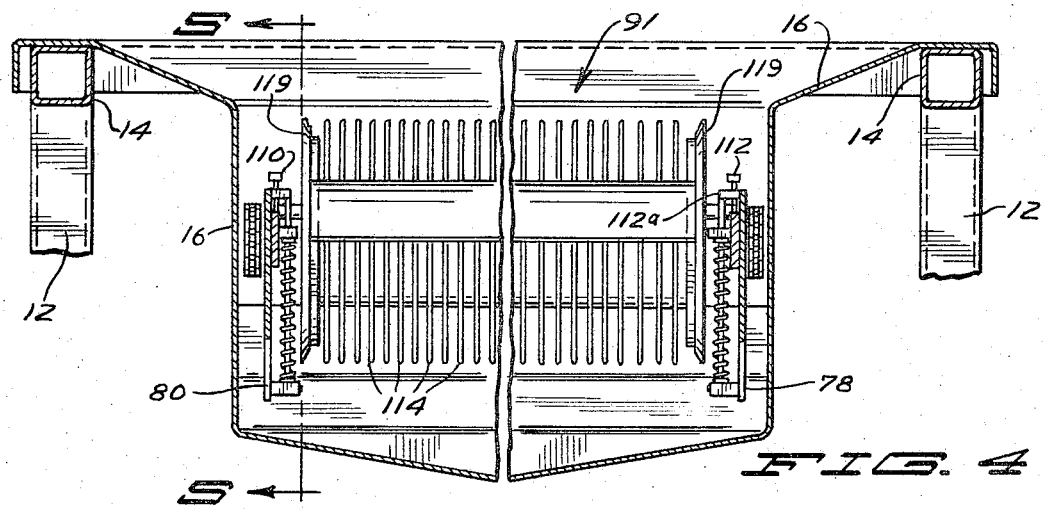
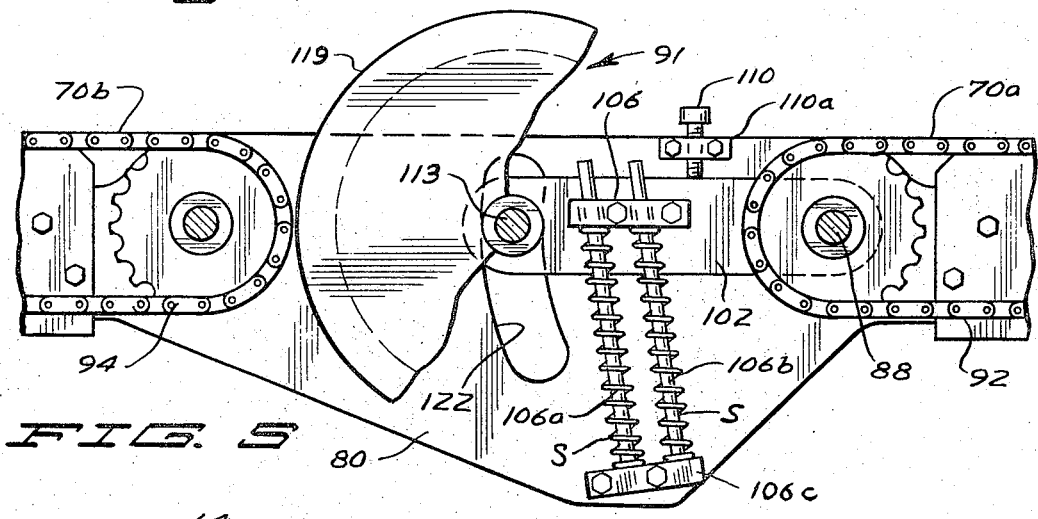
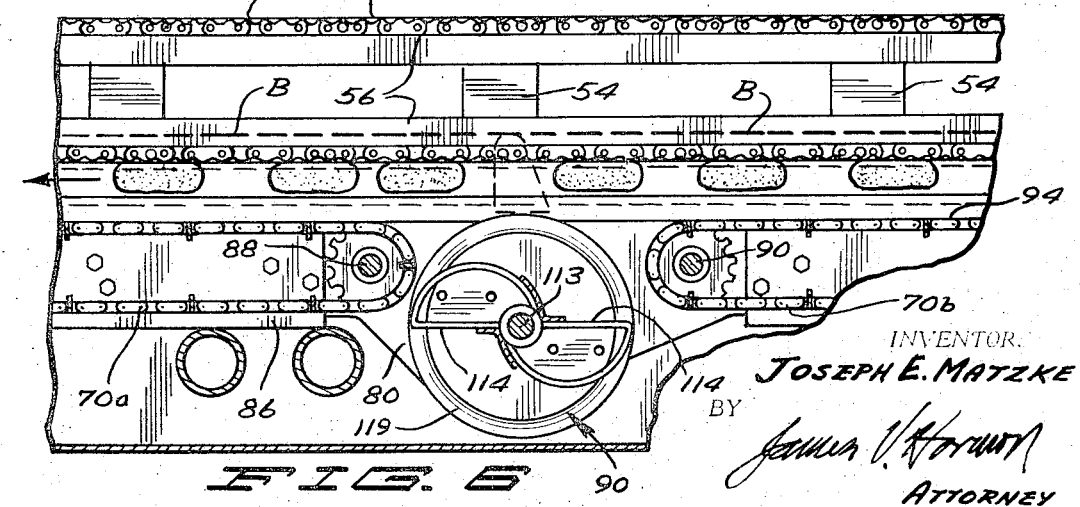

United States Patent Office 3,340,792
Patented Sept. 12, 1967

1

3,340,792
APPARATUS FOR FRYING DOUGHNUTS AND LIKE PRODUCTS
Joseph E. Matzke, Minneapolis, Minn., assignor to The Pillsbury Company, Minneapolis, Minn., a corporation of Delaware
Filed July 1, 1966, Ser. No. 562,163
8 Claims. (Cl. 99—405)

The present invention relates to cooking and frying equipment and more particularly to an improved apparatus for frying doughnuts and similar farinaceous food products. The invention is particularly useful in the frying of doughnuts at relatively high production rates on a continuous or semi-continuous basis as performed in a bakery. The invention is useful in frying both raised and cake doughnuts.

A variety of doughnut frying devices have been previously proposed and as exemplified by United States Patents Nos. 1,823,409; 1,834,182; 1,904,370 and Reissue Patent 19,535. The operation of these machines, particularly at the relatively high production rates encountered in a bakery has not been entirely satisfactory. Thus, while some of these machines are suited for frying raised doughnuts they cannot be used successfully for frying cake doughnuts. Others of these machines include conveyor devices having transversing extending bars adapted to engage the rearward surfaces of the doughnuts for conveying them through the heated frying liquid as the doughnuts float on the upper surface of the liquid. If submerged frying were attempted in these devices, the horizontally extending conveyor members would obstruct the movement of doughnuts through the apparatus. Others of the prior devices while they include provisions for submerging the doughnuts, do not include a device for reliably maintaining the doughnuts in predetermined positions on the submerging appliance.

Conveyors previously used for non-submerged frying are often of necessity provided with a turning mechanism adapted to invert the doughnuts when the cooking operation has been partially completed. Consequently, a conveyor used for submerging the doughnuts and for transferring them through the frying liquid in a submerged position could not be employed in a device suited for conveying the doughnut through the apparatus in a non-submerged position since the turning mechanism will interfere with the operation of the submerging appliance. As a result, prior machines of the type described have lacked performance flexibility.

In view of these and other deficiencies in the prior art is it one object of the present invention to provide an improved apparatus for frying doughnuts and the like in which there is provided a frying vessel, a submerging appliance and a provision for maintaining the doughnuts in their predetermined selected positions relative to the submerging appliance as they are conveyed through the cooking liquid by the submerging appliance.

Another object of the present invention is the provision of an improved doughnut frying apparatus of the type described and suited for the frying of both raised and unraised doughnuts and similar farinaceous food products wherein submerged or non-submerged frying can be carried out selectively with provision made for inverting the doughnuts when non-submerged frying is performed and a further provision to prevent the turning mechanism from interfering with the proper operation of the submerging assembly when the submerging assembly is employed.

A still further object of the present invention is the provision of an improved doughnut frying machine which includes a first and second conveyor with the first con-

2 veyor mounted for movement between retracted and operating positions, a turning mechanism associated with the second conveyor and a provision for moving the turning mechanism to a retracted position when the first conveyor is in the operative position.

A still further object of the invention is the provision of an improved doughnut frying apparatus wherein there is provided at least one conveying mechanism, the turner unit operatively associated with the conveying mechanism and a means selectively positioning the turning mechanism in any of a plurality of selected vertical positions whereby the apparatus can be properly operated with the surface of the cooking liquid at different levels.

A further object of this invention is the provision of an improved frying apparatus of the type described including upper and lower conveying mechanisms, a turning mechanism associated with the lower conveying mechanism, a provision for moving the upper conveying mechanism between upward inoperative positions and a lower operative position and a further provision on the upper conveyor mechanism for moving the turning assembly from an operative position to an inoperative position when the upper conveying mechanisms is in its operative position.

Another object of the invention is the provision of an improved frying apparatus of the type described in which upper and lower conveying mechanisms are adapted to be used selectively without removing the lower conveying mechanism from the apparatus thereby enabling the lower conveying mechanism to remain in place and not running when the upper conveying mechanism is employed.

These and other more detailed and specific objects will become apparent from the following description of the invention and drawings wherein:

FIGURE 1 is a side elevational view of an apparatus embodying the invention partly broken away.

FIGURE 2 is a partial plan view of the center of the apparatus of FIGURE 1 on a somewhat enlarged scale.

FIGURE 3 is a vertical sectional view taken on line 3—3 of FIGURE 2.

FIGURE 4 is a transverse vertical sectional view of the apparatus.

FIGURE 5 is a partial longitudinal vertical sectional view taken on line 5—5 of FIGURE 4.

FIGURE 6 is a longitudinal vertical sectional view taken on line 6—6 of FIGURE 2 with the upper retractable conveyor in the operative position and the turning assembly in its retracted and inoperative position.

Briefly, in accordance with the present invention there is provided an apparatus for frying doughnuts and other farinaceous food products of this type including a supporting framework and a vessel for holding a liquid employed for cooking. The vessel ordinarily comprises a rectangular tank having inlet and outlet ends. A first conveyor is provided above the vessel for engaging the upper surface of the doughnuts for advancing and transporting the doughnut through the cooking liquid within the vessel. A second conveyor is provided within the vessel itself for transporting the doughnut through the vessel. The conveyors can be used either simultaneously or selectively. Movable supports are connected to the upper conveyor for moving the upper conveyor from a retracted position above the vessel to an extended or operative position within the vessel. Drive means are provided for the conveyors and these are preferably synchronized to advance both of the conveyor means at the same surface speed so that the doughnuts are engaged on the top by the first conveyor means and on the sides by the second conveyor means when the conveyors are used simultaneously.

A turner assembly is provided within the vessel and is associated with the second or lower conveyor. It is preferably mounted within the vessel in the approximate center of the lower conveyor for inverting the doughnuts when partially fried. In accordance with the preferred form of the invention, the turner is movably mounted so that it can be shifted between an operable position when used for turning or inverting the doughnuts and an inoperative or retracted downward position. A pressing element is provided on the apparatus for moving the turner mechanism to its retracted position. The pressing element is preferably provided on the upper or first conveyor in position to engage portions of the turning assembly during the last part of its movement to the operative position so that the transfer of the upper conveyor to its operative position will automatically advance the turning assembly to its retracted position and thereby preventing interference between the turner and the upper conveyor so that the doughnuts transferred through the cooking liquid will be able to move freely over the turner without striking the blades thereof. Also in accordance with the preferred form of the invention, the turner is yieldably biased in a selected position, preferably toward its operative position.

A provision is also made for operating the apparatus with either the upper or lower conveyor functioning but without the necessity for removing the lower conveyor. In the accomplishment of this objective two provisions are made. First, a provision is made for retracting the turning mechanism as described above and second, a provision is made for elevating the liquid level within the vessel allowing the doughnuts to be conveyed through the apparatus in a submerged condition by means of the upper conveyor without striking the lower conveyor.

In the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

Referring now to the figures there will be seen a frying apparatus indicated generally at 10 embodying an invention including a framework having a plurality of uprights 12 and a plurality of horizontal members 14 to the top of which is suitably secured an open frying vessel 16 which is generally rectangular in shape and includes an inlet end 20 and an outlet end 18 (FIGURE 1). A plurality of horizontally extending tubes 22 are secured at each end to the side walls of the vessel and it is through these tubes that a heat transfer medium such as a heated gas is introduced for heating the liquid within the vessel 16. The liquid within the vessel 16 will ordinarily comprise a shortening material such as a suitable cooking oil or fat. Any of a variety of shortening materials previously used for this purpose can be employed.

Extending upwardly from the upward surface of the vessel 16 are a plurality of vertically disposed posts 24 to the top of which is mounted a supporting assembly 26. Two parallel transversely extending shafts 28 and 30 are mounted for pivotal movement upon journals 32 and 34 respectively. Secured to the shafts 28 and 30 are forwardly extending support arms 36 and 38. The forward ends of arms 36 and 38 are pivotally connected by means of pins 40 and 42 respectively as seen in FIGURE 1 to an upper conveyor indicated generally at 44. The arms 36 and 38 are moved between a retracted or upper position shown in FIGURES 1 and 2 and an operative position indicated by dotted lines in FIGURE 1 by the provision of actuator arms 46 and 48 connected to the shafts 28 and 30 respectively and coupled by means of a screw actuator 50 to a drive motor 52 which when driven in either forward or reverse directions is adapted to turn the screw jack 50 to thereby either elevate the conveyor 44 to the solid line position of FIGURE 1 or lower it to its operative or dotted line position of FIGURE 1. The extreme positions of the conveyor 44 can be determined in any suitable manner as by means of limit switches or the like (not shown) for controlling the operation of the motor 52.

The upper conveyor 44 includes a plurality of vertically disposed parallel and longitudinally spaced side plates 54 suitably secured as by welding to vertically spaced longitudinally extending parallel guides such as bars 56 to the ends of which are connected a pair of identical laterally spaced plates 58 at each end of the conveyor. Journalled for rotation between the plates 58 at each end of the conveyor are sprockets 60 and 62 over which is entrained an endless flexible conveyor 64 preferably formed from laterally spaced endless chains between which is secured a wire mesh 66 (FIGURE 6).

Mounted within the vessel 16 and preferably resting upon the upper surfaces of the tubes 22 is a lower conveyor indicated generally at 70. The conveyor 70 is divided into two sections, 70a and 70b as seen in FIGURES 2, 3, 5 and 6. The conveyor 70a comprises a pair of side channels 72 and 74. The conveyor 70b is formed from channels 76 and 78. At the center, aligned pairs of channels are connected together by means of the turner supporting plates 78 and 80.

As best seen in FIGURES 1, 3 and 5, the conveyor 70a includes a pair of transversely spaced parallel endless conveyor chains 82 and 84 entrained over suitable sprockets provided on shafts 86 and 88 which are themselves journalled on the conveyor supporting framework. Similarly, the conveyor 70b includes a pair of transversely extending longitudinally spaced shafts 90 and 92 suitably journalled for rotation upon the conveyor supporting framework and includes a pair of laterally spaced endless chains designated 94 and 96 entrained over suitable sprockets upon each of the shafts. The shafts 92 and 88 are connected by means of an endless chain 97 entrained over sprockets on the respective shafts (FIGURE 2). Connected between the opposed pairs of chains 82–84 and 94–96 are cross members such as bars 98 adapted to engage the rearward surfaces of the doughnuts 100 for the purpose of transporting them through the apparatus from right to left as seen in FIGURES 1 and 2 when floating on the surface of the cooking liquid present within in the vessel 16.

The turning mechanism indicated generally at 91, will now be described. As can be best seen in FIGURE 2, a pair of longitudinally extending parallel arms project forwardly from the shaft 88. These arms are designated 102 and 104. Suitably secured to the inward surface of each of the arms 102 and 104 are guides 106 and 108 within which are loosely mounted a pair of vertically extending guide rods 106a and 106b secured at their lower ends to plate 80 by a bracket 106c. A pair of similar rods 108a and 108b extend downwardly from the guide 108 and are secured at their lower end to the plate 78 by a bracket 108c. Over each of the rods is provided a spring S, only the ones on the rods 106a and 106b being shown. The spring S yieldably biases the brackets 106 and 108 and accordingly the arms 102 and 104 to the upward or operative position. The upward position of the arms can be accurately controlled by the provision of a pair of movable stop members and as screws 110 and 112 threaded upon brackets 110a and 112a affixed to the plates 80 and 78 respectively. Thus, if the position of the arms 102 and 104 is to be raised when in the elevated position, the stop members 110 and 112 are elevated. The stop members 110 and 112 are preferably threaded within the brackets 110a and 112a.

Journalled for rotation upon the ends of arms 102 and 104 is a turner unit best seen in FIGURES 4 and 5 comprising a horizontally disposed transversely extending shaft 113 to which are secured a plurality of radially extending and longitudinally spaced turning elements such as wires 114. It can be seen that the wires 114 include two diametrically opposed sets each consisting of straight and arcuate portions. The wires 114 can be rigidly secured to the shaft 112 in any suitable manner. Mounted on the ends of the shaft 113 so that rotation of the conveyor chain 82 and the shaft 88 will impart rotation to sprocket 116 and shaft 113 thereby rotating the turner unit and wires 114 such that the rotation of shaft 112 will invert the doughnuts conventionally when they are partially cooked.

As can be best seen in FIGURES 2, 3 and 5, on each end of the shaft 113 is provided disc 119. It will also be seen that there is connected to the upper conveyor 44 and specifically to the guide bars 56 a pressing element 120 (only one of which can be seen) in alignment with the disc 119 when the upper conveyor is lowered to its operative position. During the last portion of the downward movement of the upper conveyor, the engagement between the pressing elements 120 and the disc 119 will force the entire turning mechanism 91 and the free ends of the arms 102 and 104 to the downward or inoperative position about shaft 88. A slot 122 is provided in each of the plates 78 and 80 to accommodate the downward travel of the shaft 113.

The preferred operating modes will now be described. It will be assumed first that it is desired to fry the doughnuts as they travel on the surface of the cooking liquid and to invert them at the center of the vessel by means of the turner 91. When this operational mode is used, the fluid in the vessel is maintained in a lower level indicated by the letter A in FIGURE 3 which is at the approximate level with the upper surface of the channels 72 and 76 of the lower conveyor. The lower conveyor 70 is then operated by means of a drive motor 130, chains 132, 134, clutch 136 and which engages the chain 134 with the shaft 86. Chain 132 drives a shaft 133 connected to shaft 60 for driving the same by a chain 135, mating spur gears 137 and 139 and a chain 141 which is coupled between the shaft 60 and that upon which gear 139 is mounted. In this manner conveyor 44 is synchronized to run at the same surface speed as conveyor 70 with adjacent surfaces running in the same direction. The motor 130 is provided to run at a proper speed relative to the speed of the motor 66 so that the conveyors 44 and 70 will have the same surface speed.

In a first operating mode the doughnuts 100 are carried through the apparatus only by the bars 98 engaging their rearward surfaces and are inverted by the rotation turner 91 when partially cooked.

It will now be assumed that it is desired to convey the doughnuts through the apparatus by means of both the upper and lower conveyors. When this is done, the set-screw 121 is removed allowing the sprocket 116 to turn freely on the shaft 113. It should be understood that a suitable provision must be made for orienting the sprocket on the shaft 113. An orientation lug or pin is suitable for this purpose. The upper conveyor is moved downwardly by operating the motor 52 and screw jacks 50 to the dotted line position of FIGURE 1. The cooking liquid level is raised to B (FIGURE 6). The motor 130 operating through drive chains 132, 134 and clutch 136 will impart rotation to the lower conveyor chains 82, 84 and 94, 96 as described above but the turner 91 will be inoperative. In this way, the movement of the doughnuts through the apparatus will be assured by both of the conveyors and provided the spacing between the upper and lower conveyors is less than the thickness of the doughnuts, the position of the doughnuts on the surface of the screen 66 will be reliably maintained by the cross bars 98. It should also be noted that the last downward movement of the upper conveyor 44 will cause the pressing members 120 to strike the upper surfaces of the discs 119 thereby lowering the turner 91 to its retracted position and allowing the doughnuts to pass over the top of the turner beneath the wire screen 66 of the conveyor 44 without striking any portion of the turner.

In a third operational mode, only the conveyor 44 is employed and in this instance the clutch 136 is disengaged thereby causing conveyors 70a, 70b and the turner 91 to remain stationary. The upper conveyor 44 is moved downwardly to its operational position of FIGURES 1 and 6 by actuating the motor 52. The vessel is filled to the upper level B (FIGURE 6). The motor 130 is then started causing the drive chains 133, 141 and screen 66 of the conveyor 44 to begin movement thereby transporting doughnuts engaged upon the lower surface of the screen 66 from the inlet end of the apparatus to the outlet end. The doughnuts 100 will be totally submerged as they pass through the apparatus. It should also be noted that engagement between the pressing element 120 and the discs 119 will lower the turner 91 to its retracted and inoperative position again (as shown in FIGURE 6), allowing unobstructed movement of the doughnuts 100 over the turner 91.

It can be thus seen that the present invention will provide for both selective and simultaneous movement of either of a pair of vertically spaced conveyor members and that the doughnuts can be reliably conveyed through the apparatus without movement of the doughnuts relative to the upper conveyor. Furthermore, the turning mechanism will be automatically moved to a retracted position when the upper conveyor is employed. The invention also makes it possible to use an upper conveyor for submerging the doughnuts and conveying them through the cooking liquid in a totally submerged condition without the necessity for removing either the lower conveyor or the turner when the lower conveyor and turner are not in use.

It is apparent that many modifications and variations of this invention as hereinbefore set forth may be without departing from the spirit and scope thereof. The specific embodiments described are given by way of example only and in the invention is limited only by the terms of the appended claims.

I claim:

1. In an apparatus for frying doughnuts and other like farinaceous food products having a vessel adapted to contain a cooking liquid, the combination of:
   (a) an upper conveyor mounted above the vessel and adapted to move between an upper inoperative and a lower operative position,
   (b) a lower conveyor within the tank,
   (c) a retractable turner assembly mounted for movement between first and second positions for inverting the doughnuts when partially cooked in said first position and movable to said second position spaced from said upper conveyor when the upper conveyor is moved to an operative position for transferring the doughnuts through said vessel.

2. The apparatus according to claim 1 wherein said turner assembly is yieldably biased to a first position and a movable pressing member is positioned to engage said turning assembly and move the turning assembly to a retracted position when said first conveyor is lowered to said operative position.

3. The apparatus according to claim 1 wherein said turner comprises a pair of longitudinally extending arm members mounted pivotally upon said apparatus for swinging movement about a horizontal axis, a shaft member mounted for rotation between the free ends of said arms and a plurality of radially extending members mounted upon said shaft, a drive means connected to the turner for imparting rotation to the turner and a resilient means for yieldably biasing the free ends of the arms and said shaft to an upward position.

4. The apparatus according to claim 1 wherein said upper conveyor comprises a supporting framework, arms mounted upon the apparatus for supporting the conveyor from the framework for movement between said retracted and extended positions, a pair of horizontally disposed transversely extending supporting shafts on the end of the conveyor framework, an endless flexible conveyor mounted over the shafts and a drive motor connected to the shafts for turning one of the shafts and a drive mechanism operatively connected to the arms for shifting the arms between upper and lower positions for moving the upper conveyor between a raised inoperative position and a lower operative position.

5. The apparatus according to claim 1 wherein a movable pressing element is mounted upon the upper conveyor and is positioned to engage the turner when the upper conveyor is lowered to its operative position to move the turner assembly downwardly to a retracted position when the upper conveyor assembly is moved to its operative position.

6. A doughnut frying apparatus comprising in combination a supporting framework, a vessel mounted upon said framework for holding a supply of a cooking liquid, an upper conveyor mounted above the tank, a lower conveyor mounted within the tank, the lower conveyor being adapted to transport the doughnut through the apparatus when the upper surface of the liquid is at a lower level and the upper conveyor being adapted to convey the doughnuts through the liquid below the surface thereof at an elevation above the lower conveyor when the tank is filled to the upper level whereby the lower conveyor will not obstruct the movement of the doughnuts through the apparatus with the upper conveyor in an operative position and the lower conveyor is not moving.

7. An apparatus for frying doughnuts and the like comprising in combination:
(a) a supporting framework,
(b) a vessel for holding a supply of liquid, said vessel having inlet and outlet ends,
(c) a first conveyor means above the vessel for engaging the upper surfaces of the doughnuts and transporting the doughnuts through the vessel from the inlet end to the outlet end,
(d) a second conveyor means mounted upon said apparatus within the vessel for transporting doughnuts through the vessel from the inlet to the outlet end,
(e) a movable support means connected to the first conveyor for moving the first conveyor means from a retracted position out of the vessel to an extended position for conveying the doughnuts through the vessel when in the extended position, said extended position being within said vessel, and
(f) a turner assembly mounted within the vessel for shifting movement between an operable position adapted to invert said doughnuts when partially fried and a retracted position spaced from said first conveyor when said first conveyor is in said extended position within the vessel.

8. An apparatus for frying doughnuts and the like comprising in combination:
(a) a supporting framework,
(b) a vessel for holding a supply of liquid, said vessel having inlet and outlet ends,
(c) a first conveyor means above the vessel for engaging the upper surfaces of the doughnuts and transporting the doughnuts through the vessel from one end to said outlet end,
(d) a second conveyor means mounted upon said apparatus within the vessel for transporting doughnuts through the vessel from the inlet to the outlet end,
(e) a movable support means connected to the first conveyor for moving the first conveyor means from a retracted position out of the vessel to an extended position for conveying the doughnuts through the vessel when in the extended position, said extended position being within said vessel,
(f) drive means operatively associated with the first and second conveyors for advancing both of the first and second conveyor means at the same speed whereby the upper surfaces of the doughnuts are engaged by said first conveyor means and the rearward edges of the doughnuts are engaged by the second conveyor means and are thereby simultaneously advanced by both the said conveyors,
(g) a turner assembly mounted within said vessel for inverting the doughnuts when said doughnuts are partially fried,
(h) said turner assembly being mounted for shifting movement between an operable position adapted to turn the doughnuts and a retracted position spaced from the first conveyor when said first conveyor is in said extended position within the vessel.

References Cited

UNITED STATES PATENTS

| 1,823,409 | 9/1931 | Roehl | 99—504 X |
| 1,834,182 | 12/1931 | Roehl | 99—405 |
| 1,965,241 | 7/1934 | Hunter | 99—405 |

FOREIGN PATENTS 767,255  1/1957  Great Britain.

WALTER A. SCHEEL, *Primary Examiner.*

R. W. JENKINS, *Assistant Examiner.*